United States Patent

Baum

[15] 3,696,324
[45] Oct. 3, 1972

[54] ELECTRICAL DISPLAY SYSTEMS

[72] Inventor: Gilbert Baum, 152 Brite Ave., Scarsdale, N.Y. 10583

[22] Filed: Oct. 19, 1970

[21] Appl. No.: 82,227

Related U.S. Application Data

[63] Continuation-in-part of Ser. No. 827,349, May 23, 1969, abandoned.

[52] U.S. Cl. .................. 340/1 R, 73/67.7, 315/22
[51] Int. Cl. ................................ G01s 9/66
[58] Field of Search ......... 340/1 R, 3 C, 3 R; 73/67.7, 73/67.8, 67.9; 315/22, 23, 30

[56] References Cited

UNITED STATES PATENTS 3,284,659  11/1966  Outhouse et al. ............. 315/22
3,329,932  7/1967  Auer, Jr. et al. ...... 340/1 T UX

*Primary Examiner*—Richard A. Farley
*Attorney*—Auslander and Thomas

[57] ABSTRACT

Ultrasonographic display systems provide synchronization of the transducer scanning motion with the horizontal sweep of a cathode ray tube, so that horizontal displacement of the beam on the tube face is proportional to the corresponding displacement of transducer in its scanning motion. Deflection and intensity modulation of the tube beam are combined and preferably a novel expander circuit is provided for highlighting the echo signal of interest, making the system particularly suitable for medical diagnosis of tissue abnormalities.

15 Claims, 2 Drawing Figures

ELECTRICAL DISPLAY SYSTEMS

This is a continuation-in-part of application Ser. No. 827,349, filed May 23, 1969 and now abandoned.

The present invention relates to electrical display systems and more particularly to systems which simultaneously present a plurality of data parameters, of a variety of types and improve ease of discernment making possible improved diagnosis of tissue abnormalities such as the presence of tumor, for example.

Conventional medical diagnostic reading techniques in ultrasonographic detection systems has generally employed the system of intensity modulation of the displayed signals. Thus, in such known systems, the echo signal is fed to the axis or grid of a cathode ray tube whereby the light level of the displayed signal is proportional to the amplitude of the echo signal. In such systems, because of the dynamic ranges involved in typical situations, it has been found necessary to compress the signals in order that such signal would fit on the display face of the cathode ray tube. This requirement has been found to limit visibility and discrimination between the different echo signals being displayed since the human eye has substantial difficulty in distinguishing the differences in the small step on the gray scale which represent(s) the differences between echo signals corresponding to the differences in tissue structure under examination. Also prior systems have employed "fixed" reference points in the comparators resulting in loss of whole segments of the echo signal passing through the comparator irrespective of the amplitude thereof because a variable echo signal (not merely variable amplitude) crossing back and forth across the "fixed" reference signal; such a prior art circuit also result in the failure of the comparator to block undesired parts of the amplitude, i.e. the high amplitude or the low amplitude, whenever the entire echo signal (i.e. both the high and the low amplitude) is above the reference "fixed" signal or below the reference "fixed" signal—as the case may be.

Accordingly, it is an object of the present invention to provide ultrasonographic display apparatus providing a high level of discrimination between signals displayed thereon, thereby making possible more accurate tissue examination and medical diagnosis.

Another object of the present invention is the provision of display apparatus of the character described utilizing deflection modulation techniques for increasing visibility of signal differences displayed thereon.

A further object of the present invention is the provision of display apparatus of the character described including controlled amplifier means for accentuating the differences between the various signals displayed thereon.

Another object is a three-dimensional display effect on a cathode ray tube.

A further object of the present invention is the provision of display apparatus of the character described including the combination of deflection and intensity modulation techniques for providing improved discrimination between various displayed signals.

In accordance with the principles of the present invention, there is provided a novel system for displaying electrical signals comprising preferably a novel expander of the image signal normally fed to the cathode ray tube, in a preferred novel combination with a transducer means operative to scan a target and to generate an electrical signal output in response to observable parameters being detected on the target, oscilloscope means having sweep control means and means (such as a cathode ray tube) for producing a display signal in accordance with the magnitude of the transducer signal output and means for synchronizing the scanning movement of the transducer and the oscilloscope sweep control means. The novel expander embodies circuitry for improving upon a comparator output signal by imposing upon the reference signal an average image of the echo signal whereby when the average-echo-image reference-signal is fed into the comparator, the comparator (either high-set or low-set, as the case may be) blocks predetermined parts of the amplitude, but unlike prior art systems does not excise entire segments of the varying echo signal independent of high or low amplitude—this latter indescriminate excising phenomenum being characteristic of "fixed" systems (fixed reference) such as are disclosed in Auer, Jr. U.S. Pat. No. 3,329,932, Ballard U.S. Pat. No. 3,325,778, and the like.

The features of the invention which are believed to be novel are broadly described above, and are set forth with particularity in the appended claims. The invention itself, however, both as to its organization and method of operation, together with further objects and features thereof, may best be understood with reference to the following description taken in conjunction with the accompanying drawings wherein:

The more preferred medical tissue-diagnostic combination of the novel expander with the expander-fed cathode of a cathode ray tube, and a horizontal deflector and preferably also a vertical deflector, results in a three-dimensional image of improved clarity for discernment of variations in tissue structure. In the absence of a vertical deflector, the image will be radial or xy-deflection. However, inclusion of the vertical deflector is particularly preferred for embodiments to be employed in medical diagnostic procedures.

Figure 1:
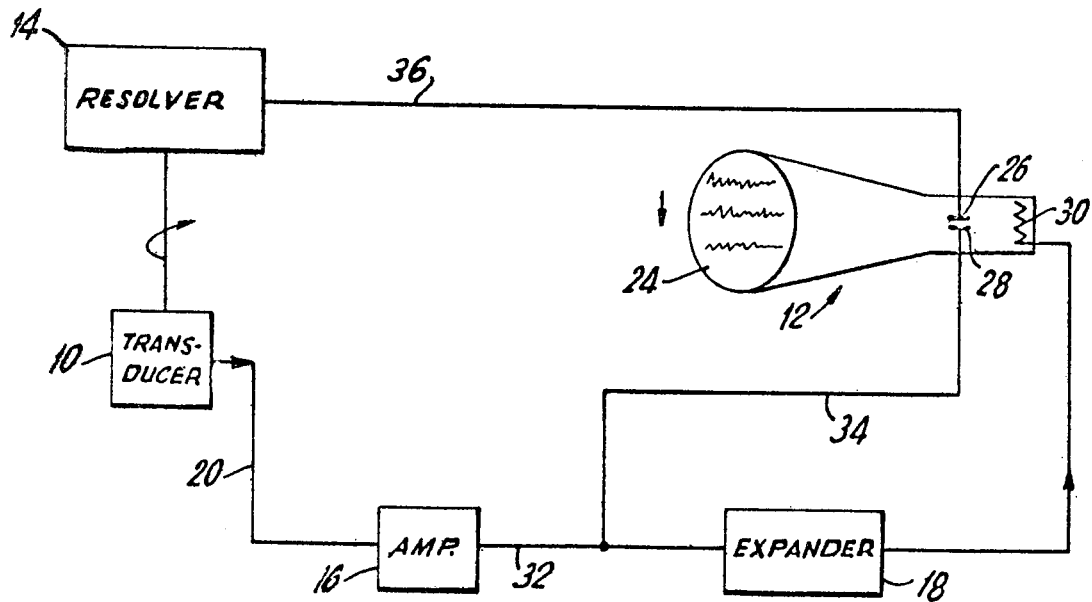
FIG. 1 is a functional block diagram description of a preferred embodiment of the present invention.

Referring in detail to the drawings and in particular to FIG. 1 thereof, an ultrasonographic display system constituted in accordance with the principles of the present invention comprises an ultrasonographic transducer 10—necessarily a high-frequency wafer-transducer when medical diagnostic use is contemplated, a cathode ray display tube 12, a resolver 14 for synchronizing the transducer and cathode ray tube sweeps, an amplifier 16 and an expander circuit 18. The amplifier normally and preferably is an alternating-current (AC) amplifier producing AC current (signal); however, a direct current (DC) signal for the lead 32. For embodiments to be employed in tissue diagnosis, an AC amplifier is preferred.

In operation, as a high-frequency wafer-transducer 10 scans the tissue under examination, the amplitude of the echo signal reflected therefrom, will vary with variations in the mechanical impedance of the tissue structure. For uses other than medical tissue diagnosis, other shaped and/or types of transducer may be employed as a part of the combination. This echo signal output is applied via lead 20 to the input of signal amplifier 16 which is operative to amplify the echo signal output.

Cathode-ray tube 12 is provided with a display screen face 24, a horizontal sweep input electrode 26, a vertical deflection input electrode 28 and an intensity input electrode 30, which are operative as described hereafter. In a conventional deflection modulation system, the height of the displayed signal (as measured from the base line) is proportional to the amplitude of the echo signal which is applied to input terminal 28, while the voltage applied to intensity electrode 30 remains substantially constant. In a conventional intensity modulation system, the echo signal is applied to intensity input electrode 30 whereby the light level of the displayed signal is proportional to the amplitude of the echo signal input. As will hereinafter become apparent, the system of the present invention incorporates both the deflection and intensity modulation techniques in the embodiment suitable for the preferred use, i.e. medical diagnosis of tissue.

The amplified echo signal output at lead 32 is applied to vertical deflection input terminal 28 via lead 34 and to the input of a variable gain expander circuit 18, whose function will be described in detail hereinafter. Functionally, expander 18 is operative to provide a greatly increased gain for input signals which exceed a predetermined level while providing a slightly increased gain for incoming signals falling below that predetermined level.

Thus, expander circuit 18 is operative to accentuate the differences between received echo signals representing differences in structure in the tissue under examination.

The horizontal sweep of the cathode ray tube is synchronized with the sweep scanning motion of the transducer 10 in the following manner. The horizontal scanning motion of transducer 10 is mechanically coupled to the shaft of resolver 14 which is operative to produce an output voltage which is proportional to the instantaneous scanning position of transducer 10. This output positional voltage is applied via lead 36 to sweep input electrode 26 to thereby synchronize the sweep position of the cathode ray beam with the sweep position of ultrasonographic transducer 10.

In view of the foregoing, the displayed signal on face 24 of tube 12 comprises two information parameters rather than the single conventional information parameter. Thus, the diagnostician (whose eye is more sensitive to vertical deflection than intensity variations in the cathode ray display beam) is presented with an ultrasonogram comprising signals whose vertical deflection (i.e., with respect to the display base line) indicates the magnitude of the echo signal and whose position on the face of cathode ray tube 12, corresponds to the position on the examined object, thus combining position and amplitude on a single display which is an important feature of the present invention. In addition to the above, the amplitude of the echo may be also used to simultaneously modulate the intensity of a cathode ray tube beam as well as being used to deflect it, thus combining intensity and deflection wherein these are proportional to the amplitude of the returning signal.

Figure 2:
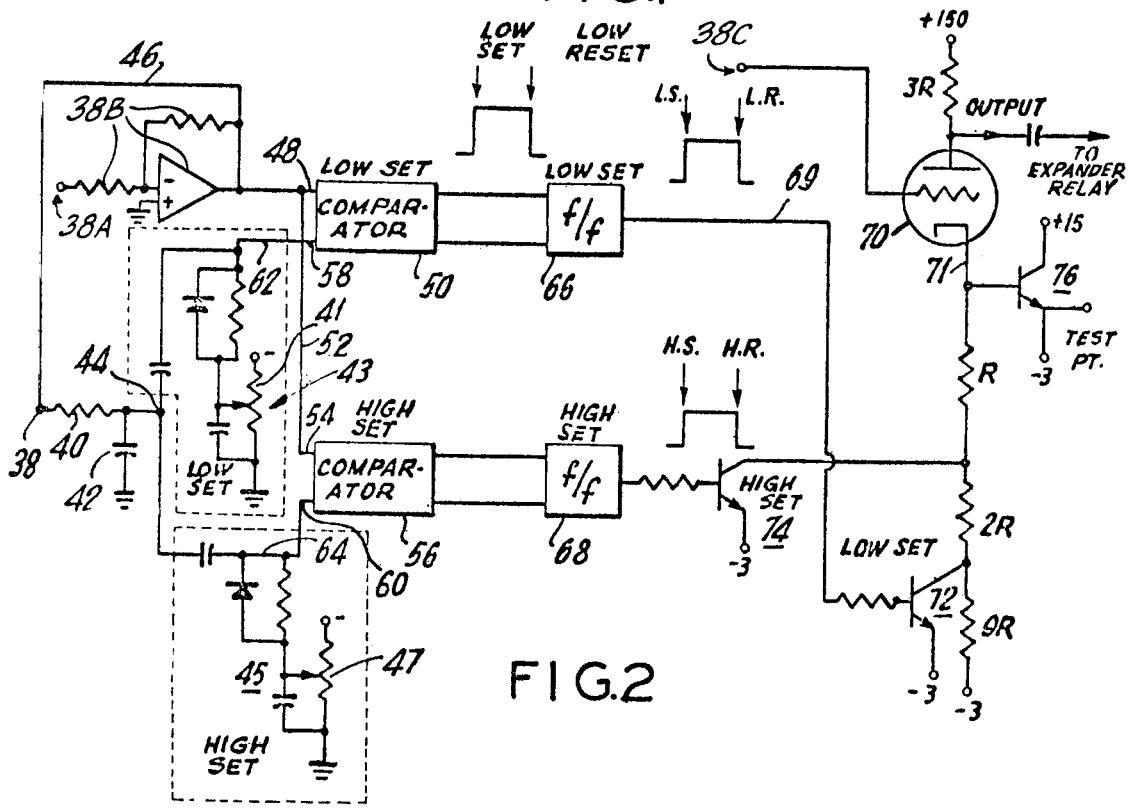
FIG. 2 is an electrical schematic diagram of the expander circuit shown in block form in FIG. 1.

As previously noted, expander 18 is operative to provide a greatly increased gain for input signals exceeding a predetermined level while attenuating others which are below another predetermined level. Reference is not made to FIG. 2 showing in schematic form, expander circuit 18 in greater detail.

The echo signal (e.g. at output lead 32 in FIG. 1) is applied to (simultaneously) input terminals 38A and 38C (which feeds the grid of a grid-control vacuum tube 70—preferably a triode, or less desireably a tetrode or pentode) and after inverting though invertor 38B (preferably a gain-of-one inverter) is integrated by an RC integrating circuit comprising resistor 40 and capacitor 42 to provide an average amplitude voltage at junction terminal 44. This voltage which represents the average level of the video ultrasonographic echo signal output of amplifier 32 is modified by low set and high set DC restorer circuits 43 and 45, which are operative respectively to clamp the input signal at junction 44 to preselected levels as set by potentiometers 41 and 47, to provide low set and high set DC reference levels, against which the rapidly changing component of the echo signal is to be compared as hereinafter described.

The inverted video echo signal is applied via lead 46 to one input terminal 48 of the low set comparator 50, and via connecting lead 52 to the corresponding one input terminal 54 of the high set comparator 56. The previously meted average amplitude reference level at terminal 44 is applied to the reference input terminals 58 and 60 via leads 62 and 64 respectively.

Comparators 50 and 56 are operative as follows. If, and only if the incoming video signal at low set comparator 50 is of amplitude below the low set reference level at terminal 58, comparator 50 will produce an output pulse to trigger low set bistable flip flop 66. If however, and only if, the incoming signal (at terminal 54) is of amplitude above the high set DC reference level at terminal 60, high set comparator 56 will produce an output pulse to trigger flip flop 68.

The outputs of high and low set flip flops 66 and 68 are respectively connected through transistors 72 and 74 to a resistor divider network comprising a series arrangement of resistors R, 2R and 9R as shown. As indicated by the foregoing notation, resistors 2R and 9R respectively, have twice and nine times the resistance values of resistor R.

The above-mentioned resistor network comprises the cathode resistor of tube 70 and are accordingly connected to cathode 71 thereof. The output of low set flip flop 66 is applied via lead 69 and is applied to the base of switching transistor 72, whereby, if flip flop 66 has a "1" output, transistor 72 is thereby rendered into the saturated condition, thereby shorting out resistor 9R to provide a total cathode resistance of 3R.

The output of high set flip flop 68 is similarly applied to the base of switching transistor 74 whereby if flip flop 68 has a "1" output, transistor 74 is thereby rendered into the saturated condition, thereby shorting out resistors 2R and 9R, leaving resistor R remaining in the cathode circuit. The output from the resistor divider network is taken at cathode 71 and is applied to the base of transistor 76.

From the foregoing, it is clear that if the video signal (i.e. at lead 46) is below the previously noted low set reference level, low set flip flop 66 will operate, to thereby provide a gain of approximately 1/4; if the video signal is greater than the high set DC reference level, then flip flop 68 will operate and the gain will be approximately 3; and if the video signal lies between the low and high set reference levels, the gain is about 1.

Referring now to FIG. 1, it is seen that expander 18 serves to further accentuate the intensity of the differences in incoming video signals to thereby highlight the information of interest.

It is understood that an identical type of display performing in an exactly (substantially exactly) analogous manner may be constructed, using laser beam modulation and deflection for these display purposes.

While preferred embodiments of the present invention have been shown and described herein, it is obvious that numerous omissions, changers, and additions may be made in such embodiment without departing from the spirit and scope of this invention.

I claim:

1. An expander device comprising in combination: an inverter means for receiving an image signal and for inverting the image signal to provide an inverted signal of a first amplitude; an average-inverted-image-signal input-integrating means connected in series with said inverter means for receiving said inverted signal and for providing a first average-amplitude-reference-voltage signal, said input-integrating means including a restorer circuit means for providing a predetermined reference level to said average signal; a first comparator means including an inverted-image-signal first receiver means connected in series with said inverter means, including an average-inverted-image-signal second receiver means connected in series with said input-integrating means, and including a blocking means for comparing said inverted-image-signal at said first receiver means with said average signal at said second receiver means and for blocking a predetermined part of said first amplitude relative to said average signal, said predetermined part being at least one of amplitude below said average signal and of amplitude above said average signal, said blocking means being further for providing an output circuit means for remaining non-blocked amplitude of said first amplitude; a grid-control tube means comprising a first cathode means connected operatively in circuit with said output circuit means, a grid means for receiving said image signal, an anode means for providing an expander signal to an expander signal relay circuit.

2. An expander device according to claim 1, including a gain-control means for altering voltage of said remaining signal.

3. An expander device according to claim 1, in which said restorer circuit means is low-set and in which said first comparator means is low-set for producing a first said remaining signal of low amplitude.

4. An expander device according to claim 1, in which said restorer circuit means is high-set and in which said first comparator means is high-set for producing a second said remaining signal of a high amplitude.

5. An expander device according to claim 3, including connected in parallel with said first comparator means and said input-integrating means a second input-integrating means having a high-set restorer circuit and a second comparator means having a high-set output signal circuit means for producing a second remaining signal at a high amplitude.

6. An expander device according to claim 5, in which said first comparator means includes a low-gain-control means connected in circuit between said output circuit means and said grid-control tube means, said low-gain control means being for providing to said grid-control tube means a first predetermined amount of increased-voltage; and in which said second comparator means includes said second output circuit means and includes a high-gain control means connected in circuit between said second output circuit means and said grid-control tube means, said high-gain control means being for providing to said grid-control tube means a second predetermined amount of increased voltage; one of said first amount and said second amount being greater than the other.

7. An expander device according to claim 6, including a cathode ray tube comprising a second cathode means connected operatively in circuit with said anode means to receive said expander signal; said anode means including a capacitor means connected in circuit between said cathode ray tube and an anode of said anode means.

8. An expander device according to claim 7, in which said cathode ray tube further comprises a vertical deflector means providing input means connectable to receive said image signal.

9. An expander device according to claim 7, in which said cathode ray tube includes a horizontal deflector means.

10. An expander device according to claim 9, in which said cathode ray tube further comprises a vertical deflector means providing an input means connected in circuit to receive said image signal, and including a transducer means for providing said image signal and operatively connected in circuit between said horizontal deflector and each of said vertical deflector input means, said inverter means, and said grid means.

11. An expander device according to claim 10, in which said transducer means is an ultrasonic high-frequency wafer-transducer.

12. An expander device according to claim 10, including a resolver means in circuit between said transducer means and said horizontal deflector, said resolver means being for synchronizing said transducer means and said horizontal deflector.

13. An expander device according to claim 10, including an amplifying means in circuit between said transducer means and said first input-signal means.

14. A diagnostic cathode-ray-tube scanning circuit comprising in combination: a cathode-ray tube means comprising a cathode, a horizontal deflector, and a vertical deflector, for displaying amplified contrasting-tissue structures; an expander means according to Claim 6 for providing an amplitude gain to at least a part of a signal receivable by said expander means, a tissue-structure-scanning ultrasonic high-frequency wafer-transducer means for echoing variations in mechanical impedance of tissue and for said signal for said expander means, said transducer means being connected in circuit between said horizontal deflector and each of said vertical deflector and said expander, and a resolver means for synchronizing said wafer-transducer means with said horizontal deflector and connected in circuit between said transducer means and said horizontal deflector.

15. A diagnostic cathode ray-tube scanning-circuit comprising in combination: a cathode-ray tube means comprising a cathode, a horizontal deflector, and a vertical deflector, for displaying amplified contrasting-tissue structures; an expander means for providing an amplitude gain to at least a part of a signal receivable by said expander means, a tissue-structure-scanning ultrasonic high-frequency wafer-transducer means for echoing variations in mechanical impedance of tissue, said transducer means being connected in circuit between said horizontal deflector and each of said vertical deflector and said expander, and a resolver means for synchronizing said wafer-transducer means with said horizontal deflector and connected in circuit between said transducer means and said horizontal deflector.

* * * * *